United States Patent

Neudecker et al.

[15] 3,667,362
[45] June 6, 1972

[54] PHOTOGRAPHIC APPARATUS WITH MEANS FOR ADJUSTING THE EXPOSURE CONTROL IN DEPENDENCY ON THE SENSITIVITY OF FILM

[72] Inventors: Karl Neudecker; Anton Theer, both of Munich, Germany

[73] Assignee: Agfa-Gevaert Aktiengesellschaft, Leverkusen, Germany

[22] Filed: Sept. 25, 1970

[21] Appl. No.: 75,501

[30] Foreign Application Priority Data

Oct. 1, 1969 Germany..................G 69 38 210.1

[52] U.S. Cl. .............................95/31 FS, 95/10 C, 352/72
[51] Int. Cl. ................................................G03b 17/18
[58] Field of Search ................95/10 C, 31 R, 31 FS, 31 CA; 352/72, 78, 141

[56] References Cited

UNITED STATES PATENTS 3,266,398  8/1966  Kremp et al..........................95/31 FS
3,461,782  8/1969  Yoshihisa Katsuyama............95/31 FS
3,495,901  2/1970  Neudecker et al. ...................95/31 FS
3,464,334  9/1969  Wilharm et al........................95/31 FS
3,364,831  1/1968  Kremp et al..........................95/31 FS
3,410,186  11/1968  Tatsuo Kaneko...................95/31 FS X
3,495,513  2/1970  Engelsmann et al. ..................95/10 C Primary Examiner—Joseph F. Peters, Jr.
Attorney—Michael S. Striker

[57] ABSTRACT

A photographic camera wherein the exposure control is automatically adjusted as a function of the speed of film in the inserted magazine. The camera has a door which opens automatically in response to unlocking and thereby disengages one or more scanning members from coding elements on the inserted magazine. The scanning member or members form part of one or more slides which are coupled to one or more adjustable parts of the exposure control and are biased in directions to move the scanning members into engagement with the corresponding coding elements. The door opening mechanism includes a strong spring which biases a lever against the door so that the lever tends to move the door toward its open position. The lever engages and retracts the slide or slides while it pivots in a direction to open the door.

10 Claims, 1 Drawing Figure

PATENTED JUN 6 1972
3,667,362
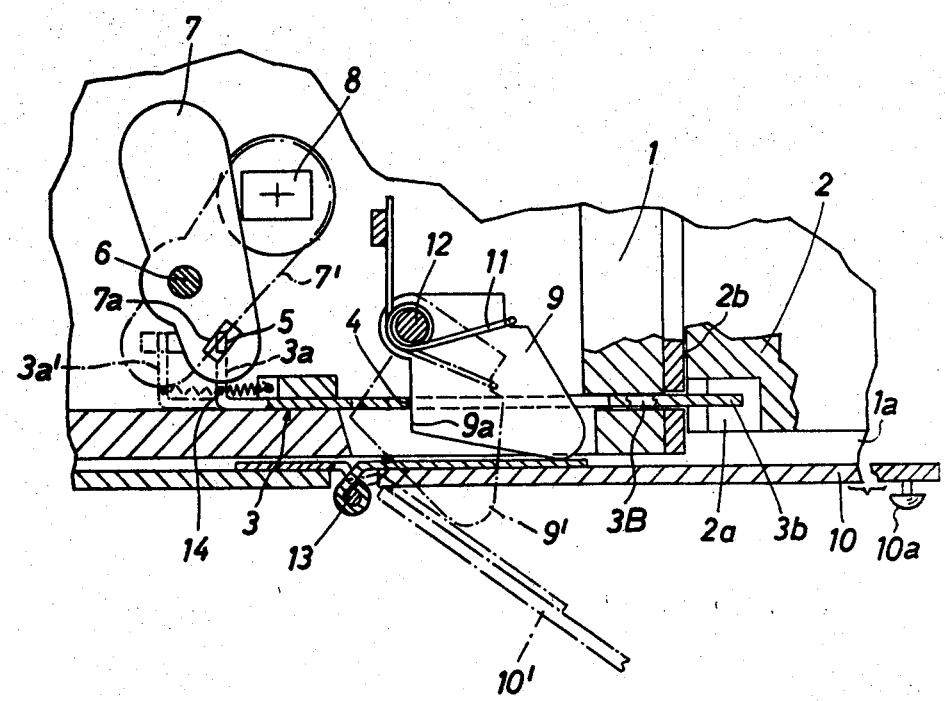
INVENTOR  
KARL NEUDECKER  
ANTON THEER

3,667,362

PHOTOGRAPHIC APPARATUS WITH MEANS FOR ADJUSTING THE EXPOSURE CONTROL IN DEPENDENCY ON THE SENSITIVITY OF FILM

BACKGROUND OF THE INVENTION

The present invention relates to photographic apparatus in general, and more particularly to improvements in photographic apparatus wherein the exposure control means can be automatically adjusted in dependency on one or more characteristics of photographic film, for example, in dependency on the speed or sensitivity of film. Still more particularly, the invention relates to improvements in photographic apparatus wherein a scanning member which can engage coding means on the container for photographic film in a still camera or motion picture camera is automatically disengaged from the coding means when the user opens a door or cover to gain access to the container.

It is already known to provide still cameras or motion picture cameras with suitable scanning means which can automatically adjust a light meter or another assembly of the exposure control means in dependency on a characteristic of the film stored in a container which is properly inserted into the housing of the camera. As a rule, the scanning means is biased toward engagement with the coding means and, in order not to damage the scanning means during insertion or removal of film containers, certain cameras already comprise means for effecting withdrawal or disengagement of the scanning means from the associated coding means on opening of the door or cover so as to make sure that the scanning means and/or the exposure control means cannot be damaged during removal or insertion of containers. The present invention relates to improvements in the just outlined types of cameras.

SUMMARY OF THE INVENTION

An object of the invention is to provide a photographic apparatus wherein a cover, a door or an analogous movable portion of the camera housing or body is operatively associated with the scanning means for coding means on containers for photographic film in a novel and improved way.

Another object of the invention is to provide a camera of the just outlined character with novel and improved adjusting means for the exposure control means.

A further object of the invention is to provide a camera wherein the exposure control means can be adjusted in dependency on several characteristics of photographic film.

An additional object of the invention is to provide a photographic apparatus wherein the mechanism for disengaging the scanning means from the coding means of a container in the camera body occupies little room and consists of a small number of simple and inexpensive parts.

A further object of the invention is to provide a camera wherein the door or cover is automatically opened in response to unlocking and wherein such automatic opening of the door or cover entails automatic positive disengagement of one or more scanning or sensing means from the corresponding coding element or elements of a film container.

The invention is embodied in a motion picture camera which comprises a housing or body having a chamber and including a portion (e.g., a door or cover) which is movable between open and closed positions to respectively permit and prevent access to the chamber, a film container removably received in the chamber and having thereon coding means which indicates at least one characteristic of the film in the container, adjustable exposure control means installed in or on the housing (such exposure control means may include a diaphragm which is adjustable by a light meter having a galavanometer in circuit with a photosensitive receiver which is exposed to scene light and which can influence the aperture size by being partly or fully exposed to scene light or by being completely sealed from scene light), adjusting means having scanning means and operatively connected with the exposure control means so that, when the adjusting means is caused to move relative to the housing between several positions, the exposure control means is adjusted in automatic response to movement of the adjusting means, first biasing means for urging the scanning means of the adjusting means against the coding means of the container in the chamber of the housing so that, when the scanning means engages the coding means, the adjustment of the exposure control means is a function of the respective characteristic of film in the inserted container, and second biasing or door opening means for urging the movable portion of the housing toward its open position and for preferably directly disengaging the scanning means from the coding means of the container in the chamber in response to movement of the movable portion toward its open position. Thus, the second biasing means can overcome the action of the first biasing means as soon as the movable portion is permitted to move toward its open position. When the camera is in use, the movable portion is normally locked in the closed position by a latch or the like. In order to insure that the second biasing means can move the movable portion of the housing to its open position, the operator must unlatch the movable portion; the movable portion thereupon opens automatically and the second biasing means then automatically disengages the scanning means from the coding means.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a schematic fragmentary horizontal sectional view of a still camera which embodies the invention.

DESCRIPTION OF THE PREFERRED EMBODIMENTS

The drawing illustrates a portion of a still camera which includes a housing or body 1 having a movable portion or door 10 which pivotable between a closed position indicated by solid lines and an open or partly open position 10' indicated by phantom lines. The housing 1 defines an internal chamber 1a which is accessible in the open position of the door 10 but is sealed when the door is caused to move to and remains in the closed position. The camera is further provided with a suitable locking or latch mechanism, for example, a mechanism having a knob 10a provided on the door 10 and turnable between locking and unlocking positions to thereby prevent or permit movement of the door to and beyond the position 10'. The details of the locking mechanism form no part of the present invention.

The chamber 1a of the housing 1 can receive film containers 2 in the form of magazines or cassettes having thereon one or more coding elements constituting a coding means which is indicative of one or more characteristics of the film in the container 2. The drawing shows a first coding element 2a which is a notch provided in the left-hand wall of the container 2, and a second coding element 2b which forms an integral part of the left-hand wall.

The adjustable exposure control means of the camera comprises a light meter having a photosensitive receiver 8 which is exposed to scene light and a filter 7 which can constitute a translucent or opaque foil or whose light transmissivity varies, and which is pivotable in the housing 1 about a shaft 6 so that it can move between at least two positions which are respectively indicated by solid lines and phantom lines. In the solid-line position, the filter 7 is located adjacent to the path of scene light which impinges on the receiver 8 (e.g., a photosensitive resistor) so that the resistance of the receiver 8 is relatively low. In the phantom line position 7', the filter 7 overlaps the receiver 8 so that the latter's resistance increases. Such change in resistance of the receiver 8 influences the exposure, for example, by causing a change in the aperture size defined by a suitable diaphragm. The filter 7 has a rectangular aperture 7a and is directly coupled to a bent-over end portion 3a of a reciprocable adjusting member or slide 3 which is mounted in the housing 1 for movement between a plurality of positions each of which corresponds to a different adjustment of the exposure control. The end portion 3a has a polygonal tip 5 which extends into the aperture 7a of the filter 7. A second end portion 3b of the adjusting member 3 is rigid or integral with the end portion 3a and constitutes a scanning or sensing member which engages the coding element 2a of the inserted container 2 to thereby effect an adjustment of the filter 7 (and hence of the adjustable exposure control) as a function of the sensitivity or speed of the film in the container 2. It is assumed that the characteristic which is indicated by the coding element 2a is the sensitivity or speed of the film. The coding element 2b can be indicative of a second characteristic of the film, for example, whether the film is intended for use in daylight or with artificial illumination of the subject.

A first biasing means here shown as including a relatively weak helical spring 14 operates between the adjusting member 3 and the housing 1 and urges the scanning member 3b toward engagement with (i.e., into) the coding element 2a. A median portion of the adjusting member 3 is provided with a shoulder or abutment 4 which can be engaged by one arm of a pivotable member or lever 9 forming part of a second biasing or door opening means which permanently urges the door 10 toward the open position 10'. The second biasing means further includes a torsion spring 11 which is stronger than the spring 14 and is convoluted around a pivot 12 for the lever 9. The mounting of the torsion spring 11 is such that the arm of the lever 9 tends to pivot the door 10 in a clockwise direction, as viewed in the drawing. The position 9' in which the lever 9 holds the door 10 in the open position 10' is indicated by phantom lines. The lever 9 then directly engages the shoulder 4 of the adjusting member 3 and holds the scanning member 3b in a retracted position (see the position 3a' of the end portion 3a) in which the scanning member 3b is sufficiently disengaged from the coding element 2a to permit unimpeded insertion or removal of containers 2 from the chamber 1a. It will be noted that the axis of the pivot 12 for the lever 9 is parallel with and rather closely adjacent to the axis of the pintle 13 of the hinge which secures the door 10 to the housing 1. This is desirable because the lever 9 is then capable of producing a strong opening force even though its door-engaging arm is rather short and because the lever 9 can move the door to a fully or nearly fully open position.

The operation:

The user of the camera inserts a fresh container 2 into the chamber 1a while the door 10 is held in its open position. The torsion spring 11 then holds the lever 9 of the second biasing means in the position 9' so that the lever bears directly against the shoulder 4 and holds the adjusting member 3 in a position in which the scanning member 3b is sufficiently retracted to permit unimpeded removal of the previously employed container and unimpeded insertion of the illustrated container 2. The end portion 3a of the adjusting member 3 maintains the filter 7 in the position 7' so that the filter overlies the photosensitive receiver 8.

The user thereupon moves the door 10 to the closed position and actuates the knob 10a so as to prevent unintentional opening of the door. As the door moves from the position 10' toward the solid-line position, its inner side pivots the lever 9 counterclockwise against the opposition of the torsion spring 11 whereby the lever 9 moves its edge face 9a counterclockwise. This enables the spring 14 to move the adjusting member 3 in a direction to the right toward the illustrated position so that the scanning member 3b automatically enters the coding element 2a. Consequently, the end portion 3a of the adjusting member 3 pivots the filter 7 from the position 7' to the solid-line position so that the filter cannot obstruct scene light from reaching the receiver 8. Such pivoting of the filter 7 away from the path for scene light constitutes an adjustment of the exposure control means as a function of the sensitivity of film in the inserted container 2.

If the container in the chamber 1a contains a film whose sensitivity is different from the sensitivity of the film in the illustrated container, the container in the chamber 1a will have a different coding element in such position that the coding element is engaged by the scanning member 3b when the container is properly inserted into the housing 1. For example, the sensitivity-indicating coding element of such container may be identical with the coding element 2b, i.e., it may form part of the left-hand wall of the inserted container. When the door 10 is thereupon moved from the phantom-line position 10' toward the closed position, the lever 9 of the second biasing means is pivoted in the same way as described above; however, the scanning member 3b engages the corresponding coding element (i.e., a portion of the left-hand wall of the inserted container) and is thereby held in such position that the filter 7 (in the position 7') continues to overlap the photosensitive receiver 8. This constitutes an adjustment of the exposure control means as a function of the sensitivity of film in the container which is located in the chamber 1a. It is clear that the filter 7 can be moved between three or more positions if the camera is designed to accommodate containers with films of three or more different sensitivities. Also, the adjusting member 3 can be used to adjust a retard mechanism in the shutter, to directly adjust the diaphragm, to adjust a variable resistor other than the receiver 8, and/or to adjust one or more other parts of the exposure control means in a still camera or motion picture camera.

As soon as the user of the camera moves the knob 10a to the unlocking position, the spring 11 immediately propels the door 10 toward the position 10' whereby the lever 9 withdraws the scanning member 3b from engagement with the coding element 2a (or with a different coding element) so that the container can be readily withdrawn from the chamber 1a or a new container inserted into the chamber without any damage to the adjusting member 3 and/or to the exposure control.

The drawing further shows a portion of a second scanning member 3B (behind the broken-away part of the scanning member 3b) which can engage the coding element 2b of the inserted container 2. The scanning member 3B can form part of a second adjusting member which adjusts another part or assembly of the exposure control means in dependency on another characteristic of film in the inserted container, for example, in dependency on the type of film (whether for use in daylight or in artificial light). The scanning member 3B can be used to determine the position of another filter which is movable into and from the path of light passing through the picture taking objective and impinging on the unexposed film frames. The adjusting member 3 can be mounted for pivotal movement between a plurality of positions.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In a photographic apparatus, a combination comprising a housing having a chamber; a film container removably received in said chamber and having coding means to indicate at least one characteristic of the film therein; said housing including a portion movable between spaced apart open and closed positions to respectively permit and prevent access to said chamber for insertion and removal of said film container; adjustable exposure control means in said housing; adjusting means having scanning means and operatively connected with said exposure control means, said adjusting means being movable in said housing between a plurality of positions each of which corresponds to a different adjustment of said exposure control means; first biasing means for urging said scanning means against the coding means of the container in said chamber so that, when the scanning means engages a coding means, the adjustment of said exposure control means is a function of said characteristic of film in the respective container; and second biasing means for urging said portion of said housing to said open position and for disengaging said scanning means from the coding means of the container in said chamber against the opposition of said first biasing means when said portion of said housing is free to move to said open position under the action of said second biasing means.

2. A combination as defined in claim 1, wherein said portion of said housing is pivotable between said open and closed positions about a first axis and wherein said second biasing means comprises a lever pivotable in said housing about a second pivot axis closely adjacent to said first axis, said lever having an arm and said second biasing means further comprising spring means urging said arm against said portion of said housing to thereby bias said portion toward its open position.

3. A combination as defined in claim 1, wherein said adjusting means is reciprocable in said housing between said plurality of positions.

4. A combination as defined in claim 1, wherein said adjusting means has a shoulder and said second biasing means comprises a member which bears against said shoulder to thereby hold said scanning means away from engagement with the coding means of the container in said chamber at least in the open position of said portion.

5. A combination as defined in claim 1, wherein said exposure control means comprises photosensitive receiver means normally exposed to scene light and filter means receiving motion from said adjusting means and movable into and away from the path of scene light which impinges on said receiver means in response to movements of said adjusting means.

6. A combination as defined in claim 1, wherein said chamber is arranged to accommodate containers of the type whereon the coding means comprises a plurality of coding elements and wherein said scanning means comprises a plurality of scanning members each arranged to engage a different coding element of the container in said chamber.

7. A combination as defined in claim 1, wherein said exposure control means comprises a filter which is movable between plural positions in response to movement of said adjusting means.

8. A combination as defined in claim 1, wherein each of said biasing means comprises at least one spring and wherein the spring of said second biasing means is stronger than the spring of said first biasing means.

9. A combination as defined in claim 1, wherein said coding means comprises a notch on the film container.

10. A combination as defined in claim 1, wherein said exposure control means comprises an adjustable member which is directly coupled to a first portion of said adjusting means and wherein said scanning means constitutes a second portion of said adjusting means and is rigid with said first portion.

* * * * *